(12) United States Patent
Lee et al.

(10) Patent No.: US 7,761,653 B2
(45) Date of Patent: Jul. 20, 2010

(54) FLASH MICRO-CONTROLLER WITH SHADOW BOOT-LOADER SRAM FOR DUAL-DEVICE BOOTING OF MICRO-CONTROLLER AND HOST

(75) Inventors: Charles C. Lee, Cupertino, CA (US);
David Q. Chow, San Jose, CA (US);
Abraham C. Ma, Fremont, CA (US);
Frank Yu, Palo Alto, CA (US);
Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 467 days.

(21) Appl. No.: 11/875,648

(22) Filed: Oct. 19, 2007

(65) Prior Publication Data

US 2008/0040598 A1 Feb. 14, 2008

Related U.S. Application Data

(60) Continuation-in-part of application No. 11/624,667, filed on Jan. 18, 2007, which is a division of application No. 09/478,720, filed on Jan. 6, 2000, now Pat. No. 7,257,714, which is a continuation-in-part of application No. 09/366,976, filed on Aug. 4, 1999, now Pat. No. 6,547,130, application No. 11/875,648, which is a continuation-in-part of application No. 11/466,759, filed on Aug. 23, 2006, now Pat. No. 7,702,831, which is a continuation-in-part of application No. 10/789,333, filed on Feb. 26, 2004, now Pat. No. 7,318,117, application No. 11/875,648, which is a continuation-in-part of application No. 09/366,976, and a continuation-in-part of application No. 11/773,830, filed on Jul. 5, 2007, which is a continuation-in-part of application No. 11/309,594, filed on Aug. 28, 2006, now Pat. No. 7,383,362, which is a continuation-in-part of application No. 10/707,277, filed on Dec. 2, 2003, now Pat. No. 7,103,684.

(51) Int. Cl.
*G06F 12/00* (2006.01)
(52) U.S. Cl. ...................................... 711/103
(58) Field of Classification Search ................. None
See application file for complete search history.

(56) References Cited

U.S. PATENT DOCUMENTS

| 7,305,544 | B2 * | 12/2007 | Bulusu et al. | 713/2 |
| 2005/0138414 | A1 * | 6/2005 | Zimmer et al. | 713/201 |
| 2007/0067614 | A1 * | 3/2007 | Berry et al. | 713/1 |

\* cited by examiner

*Primary Examiner*—Brian R Peugh
(74) *Attorney, Agent, or Firm*—Stuart T. Auvinen; gPatent, LLC

(57) ABSTRACT

A flash microcontroller has a Static Random-Access-Memory (SRAM) buffer that stores several blocks of boot code read from a flash memory. The boot code includes an initial boot loader, boot code and a control program that are executed by the flash microcontroller, and an operating system OS image and an external-host control program that are executed by an external host. Both the external host and the microcontroller are booted from boot code buffered in the SRAM buffer. A first-reset-read address from the external host is captured by the microcontroller during its boot sequence and stored in a mapping table along with a physical address of the block in the SRAM buffer with the operating system OS image and the external-host control program. A boot-loader state machine reads the flash ID and programs flash parameter registers with timing parameters for the flash memory.

20 Claims, 12 Drawing Sheets

FLASH MICRO-CONTROLLER WITH SHADOW BOOT-LOADER SRAM FOR DUAL-DEVICE BOOTING OF MICRO-CONTROLLER AND HOST

RELATED APPLICATION

This application is a continuation-in-part (CIP) of the application Ser. No. 11/773,830 filed Jul. 5, 2007, for "Molding Method to Manufacture Single-Chip On-Board Device", which is a CIP of U.S. patent application for "Single Chip Multi-Media Card/Secure Digital (MMC/SD) Controller Reading Power-on Boot Code from Integrated Flash Memory for User Storage", U.S. application Ser. No. 11/309,594 filed Aug. 28, 2006, now U.S. Pat. No. 7,383,362, which is a CIP of "Single-Chip USB Controller Reading Power-on Boot Code from Integrated Flash Memory for User Storage", U.S. application Ser. No. 10/707,277, filed Dec. 2, 2003, now U.S. Pat. No. 7,103,684.

This is also a continuation-in-part (CIP) of the application for "Electronic Data Storage Medium with Fingerprint Verification Capability", U.S. Ser. No. 11/624,667 filed Jan. 18, 2007, which is a divisional application of U.S. patent application Ser. No. 09/478,720, filed on Jan. 6, 2000, now U.S. Pat. No. 7,257,714, which has been petitioned to claim the benefit of CIP status of one of inventor's earlier U.S. patent applications for "Integrated Circuit Card with Fingerprint Verification Capability", U.S. application Ser. No. 09/366,976, filed Aug. 4, 1999, now issued as U.S. Pat. No. 6,547,130, and "Flash Memory Controller for Electronic Data Flash Card" U.S. Ser. No. 11/466,759, filed Aug. 23, 2006, which is a CIP of "System and Method for Controlling Flash Memory", U.S. Ser. No. 10/789,333, filed Feb. 26, 2004 now U.S. Pat. No. 7,318,117.

This application is related to "Flash memory device and architecture with multi level cells", U.S. Ser No. 10/800,228, filed Mar. 12, 2004, now U.S. Pat. No. 7,082,056, and "Flash drive/reader with serial-port controller and flash-memory controller mastering a second RAM-buffer bus parallel to a CPU bus", U.S. Ser. No. 10/605,140, filed Sep. 10, 2003, now U.S. Pat. No. 6,874,044.

FIELD OF THE INVENTION

This invention relates to flash micro-controllers, and more particularly to flash microcontrollers with a SRAM for booting two devices.

BACKGROUND OF THE INVENTION

Hard disks and other mass storage devices are being replaced or supplemented with solid-state mass storage such as flash memories. Flash memories use non-volatile memory cells such as electrically-erasable programmable read-only memory, (EEPROM), but are not randomly accessible at the byte level. Instead, whole pages or sectors of 512 bytes or more are read or written together as a single page. NAND flash memory is commonly used for data storage of blocks. Pages in the same block may have to be erased together, and limitations on writing may exist, such as only being allowed to write each page once between erases.

Program code is often stored in randomly-accessible memory such as a ROM or a NOR flash memory. Since NOR flash memory is byte-addressable, NOR flash can store code that can be executed. Byte-addressing is needed to execute code, since branch and jump instructions may have a target that is at a random location that must be fetched next. The target may be byte-addressable. Since boot routines execute instructions one at a time, rather than a whole page at a time, randomly-accessible memory is needed for boot-code execution.

Small portable devices such as personal digital assistants (PDA), multi-function cell phones, digital cameras, music players, etc. have a central processing unit (CPU) or microcontroller that must be booted just as a PC or host CPU must be booted. These small devices are often quite cost and size sensitive. Having a NOR flash or ROM may increase the size and cost of these portable devices.

NAND flash memory is less expensive than NOR flash memory, and thus preferable from a cost standpoint. NAND flash memory may already be present on some devices such as cell phones or music players as the primary mass storage memory. It is thus desirable to use NAND flash memory to store boot code.

Computers once required a complex series of steps to initialize and make them ready to run programs. Instructions for bootstrapping the computer were loaded into the computer after power-on, such as by manually toggling switches representing the 1's and 0's of bootstrap instructions on the front panel. The computer was brought from a dead state into a useful state, like lifting the computer up by its own bootstraps.

More recently, computers still execute a complex sequence of instructions after power-on to boot the computer and load its operating system (OS). The initial instructions may reside in a read-only memory (ROM), along with a personal computer's Basic Input-Output System (BIOS). The operating system such as Windows may be loaded from the hard disk, and when booting is complete the OS can execute user programs. Various system checks such as peripheral device and memory detection and sizing can be performed during booting.

Both the flash device and the host must be booted at some point in time. Typically, the host is booted from its hard disk before the flash device is inserted into the host. The flash device is then booted when power from the host reaches the flash device.

What is desired is a flash-memory microcontroller that is bootable from boot code stored in flash memory. It is further desired to boot both the flash microcontroller and the host. A flash microcontroller with enhanced booting performance is also desired.

DETAILED DESCRIPTION

The present invention relates to an improvement in flash microcontrollers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
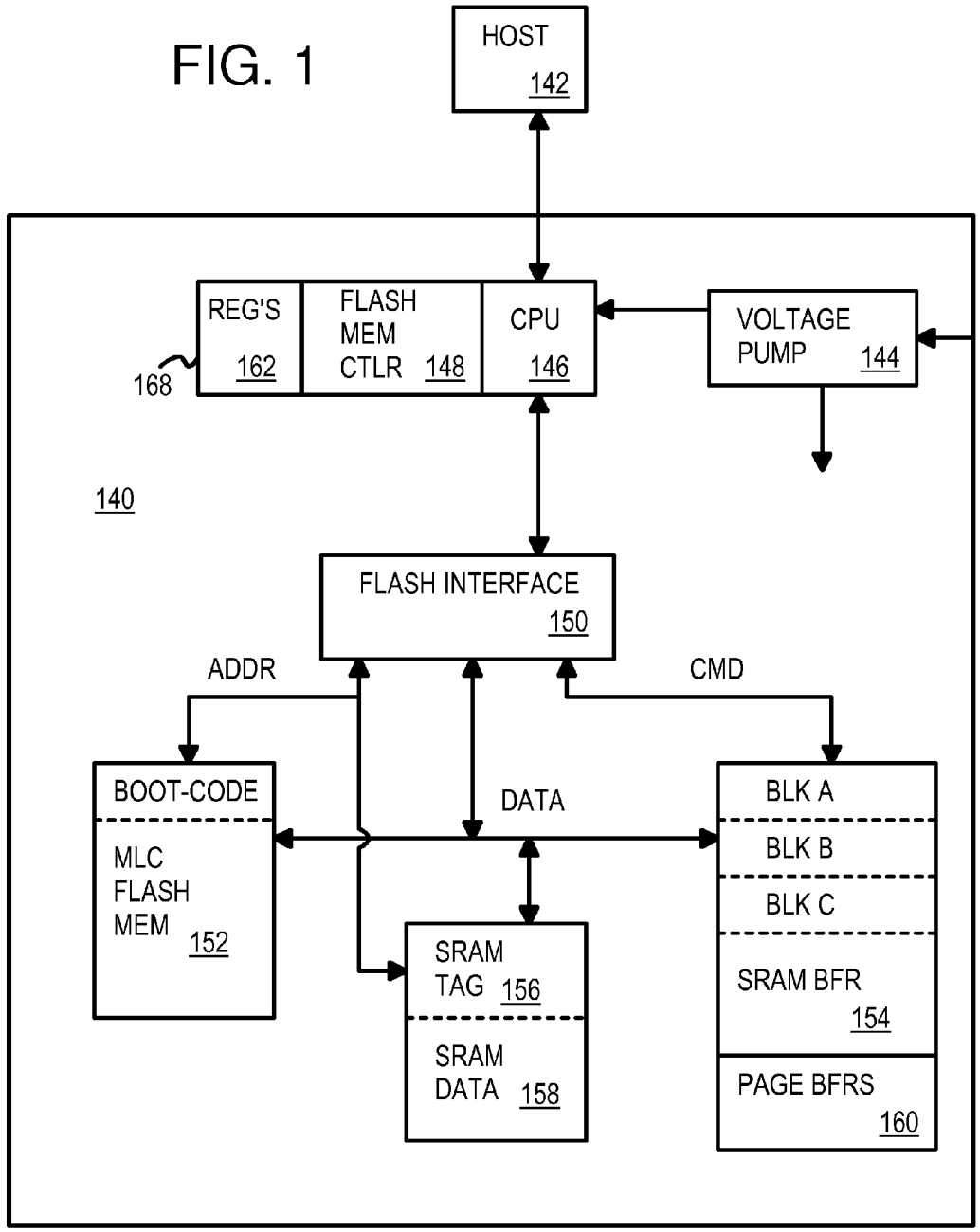
FIG. 1 is a block diagram of a flash microcontroller with a boot-loader SRAM for dual-device booting.

FIG. 1 is a block diagram of a flash microcontroller with a boot-loader SRAM for dual-device booting. Flash device 140 is plugged into host 142 and powers up when plugged in. Flash device 140 generates internal supply voltages from an external power supply input using voltage pump 144. Central Processing Unit (CPU) 146 processes commands from host 142 which update operating registers 162 which control operation of flash memory controller 148. Operating registers 162, CPU 146, and flash memory controller 148 may be part of microcontroller 168.

Flash interface 150 provides a lower-level memory interface to multi-level-cell MLC flash memory 152, which may contain one or more flash-memory chips, and to SRAM. SRAM buffer 154 may contain block and page buffers of data that is stored in MLC flash memory 152, such as boot code. SRAM buffer 154 stores both blocks and smaller pages. Pages are stored in page buffer 160.

Flash interface 150 generates signals for address, data, and command buses and associated control signals to the physical memory devices, both flash and SRAM. A SRAM cache of the data in MLC flash memory 152 is also provided by SRAM data cache 158, with its associated tags stored in SRAM tags 156. Requests that match SRAM tags 156 may be accessed in SRAM data cache 158, which has a faster access time than MLC flash memory 152.

Figure 2:
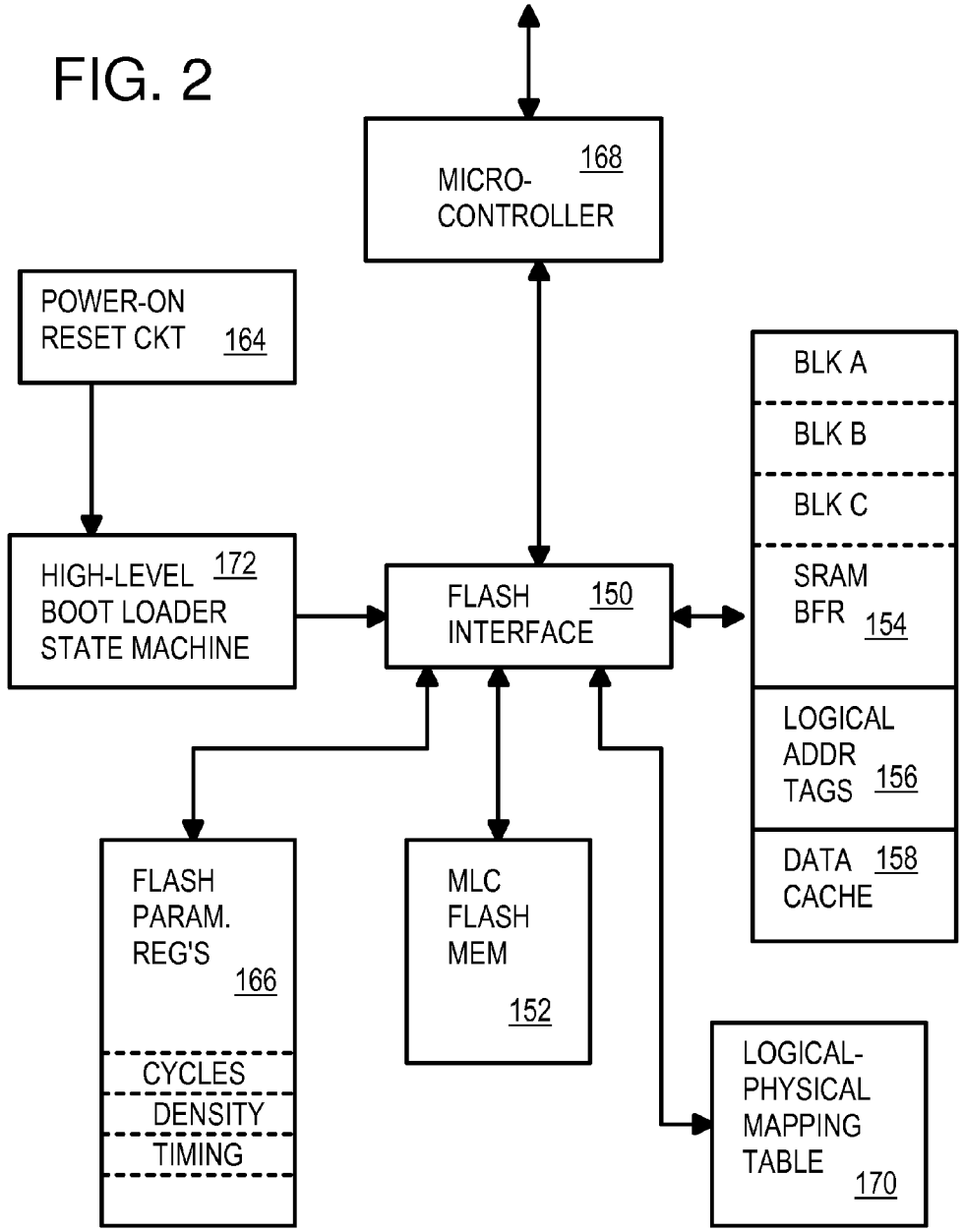
FIG. 2 shows a flash device in more detail.

FIG. 2 shows a flash device in more detail. Microcontroller 168 receives high-level requests from a host using a bus protocol and generates lower-level memory-access commands that are sent to flash interface 150. Flash interface reads, writes, and erases flash memory in MLC flash memory 152, but can also access data more quickly using SRAM buffers 154. SRAM buffers 154 is an array of SRAM that can be partitioned into a cache with SRAM tags 156 and SRAM data cache 158.

SRAM buffers 154 can also include buffers used to store boot code that is read from MLC flash memory 152. Blocks A, B, C can store blocks of boot or operating system (OS) code read from MLC flash memory 152. When power-on is detected by power-on reset circuit 164, boot-loader state machine 172 can be activated. Boot-loader state machine 172 configures flash interface 150 by reading parameters from flash parameter registers 166 and programming these flash parameters into flash interface 150. These flash parameters are device-specific, and include device specifications such as the density and width of MLC flash memory 152, the number of cycles needed for access, and other timing requirements that must be met. Once boot-loader state machine 172 configures flash interface 150, boot-loader state machine 172 activates flash interface 150 to read the first page of the first block from MLC flash memory 152. This first page contains system pointers to boot code in the flash. These pointers are flowed to locate instructions to jump to in the initial boot code, or in extended boot code. Additional boot code, control programs, and OS images are successively read from MLC flash memory 152 and loaded into SRAM buffers 154 for execution by the CPU in microcontroller 168. Once this CPU is booted and running its OS, more boot code for the external host may be read from MLC flash memory 152 and sent to the host, so that the host can be booted.

Once the host is booted, mappings from host (logical) addresses to flash (physical) addresses may be stored in mapping table 170. Flash interface 150 uses these mappings in mapping table 170 to locate physical pages in MLC flash memory 152 that correspond to the logical addresses from host requests.

Figure 3:
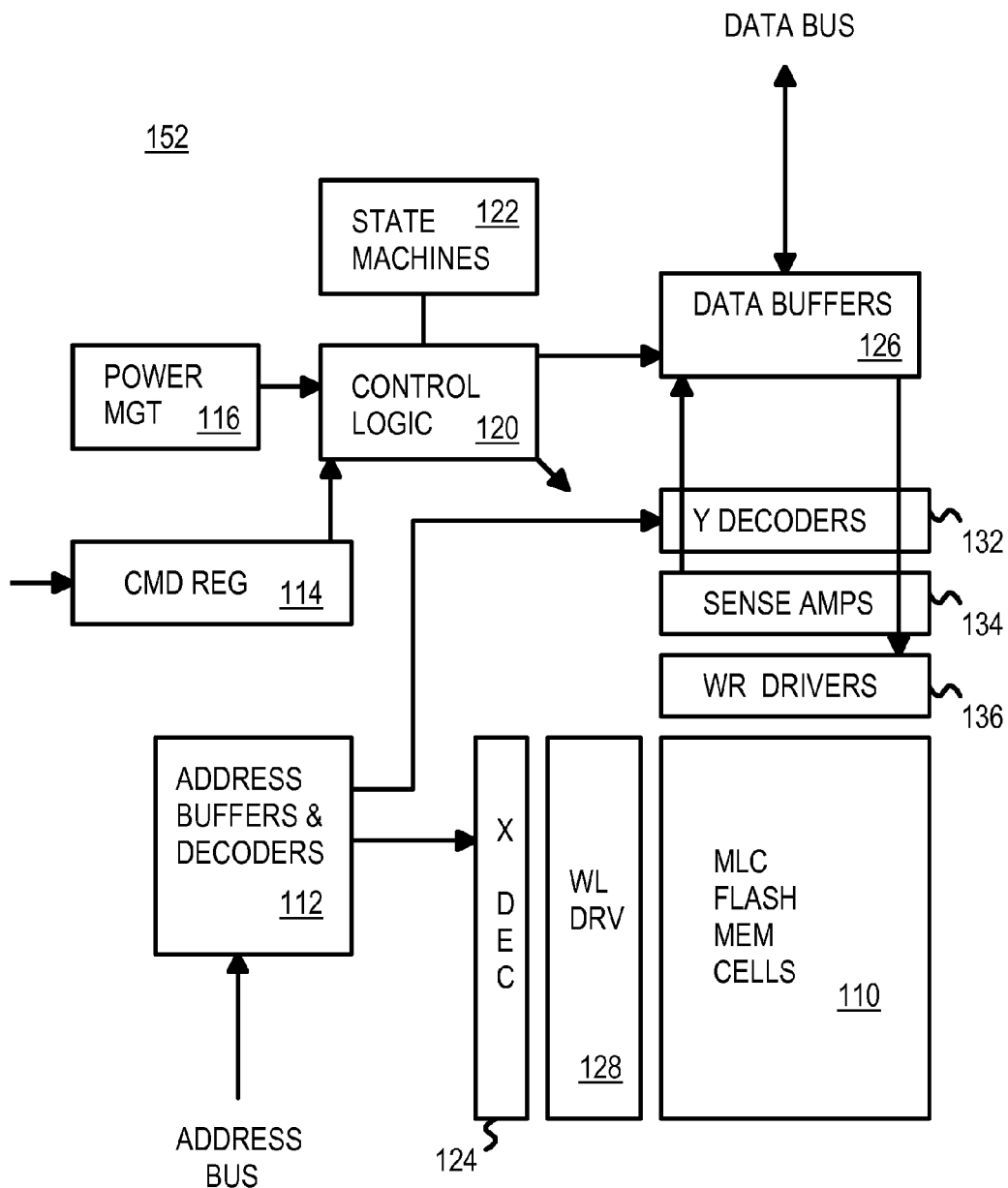
FIG. 3 shows a flash memory.

FIG. 3 shows a flash memory. Flash memory 152 may include some or all of the blocks shown in FIG. 3, and other blocks, or some of the functions may be performed by a separate flash controller. Flash memory 152 may be a separate flash chip or may be integrated with the flash microcontroller.

Flash-memory MLC cells 110 is an array of rows and columns of multi-level cell (MLC) EEPROM transistors that can store multiple bits of data in each memory cell using different voltage levels. The MLC cell's voltage levels are sensed by sense amplifiers 134 when a read current is drawn through a selected row of MLC cells. Word line drivers 128 drives one row or word line in MLC cells 110 while the other rows are disabled. A row portion of an address applied to address decoder 112 is further decoded by X decoder 124 to select which row to activate using word line drivers 128.

A column portion of the address applied to address decoder 112 is further decoded by Y decoder 132 to select a group of bit lines for data access. Data buffers 126 may be a limited width, such as 64 bits, while MLC cells may have a larger number of bit lines, such as 8×64 columns. One of the 8 columns may be selected by Y decoder 132 for connection to data buffers 126.

During writing, external data is collected by data buffers 126 and applied to write drivers 136. Write drivers 136 generate voltages or currents so that the set currents are applied to bit lines for MLC cells that are to be written with a 1, while reset currents are applied to bit lines for MLC cells to be reset to 0.

State machines 122 can activate control logic 120 to enable and disable write drivers 136 after programming or erasure. State machines 122 can generate various internal control signals at appropriate times, such as strobes to pre-charge bit lines and latch sensed data into data buffers 126.

Command register 114 can receive commands that are decoded and processed by control logic 120. External control signals such as read/write, data strobes, and byte enables may also be received in some embodiments. Command register 114 may be replaced by a command decoder in some embodiments. Power management unit 116 can power down blocks to reduce power consumption, such as when the MLC flash memory is de-selected. Since MLC cells 110 are non-volatile, data is retained when power is disconnected.

There may be several arrays of MLC cells 110 and associated logic on a large MLC flash chip. An array-select portion of the address can be decoded by address decoders 112 to enable one of the many arrays or blocks on the MLC flash memory or chip.

Figure 4:
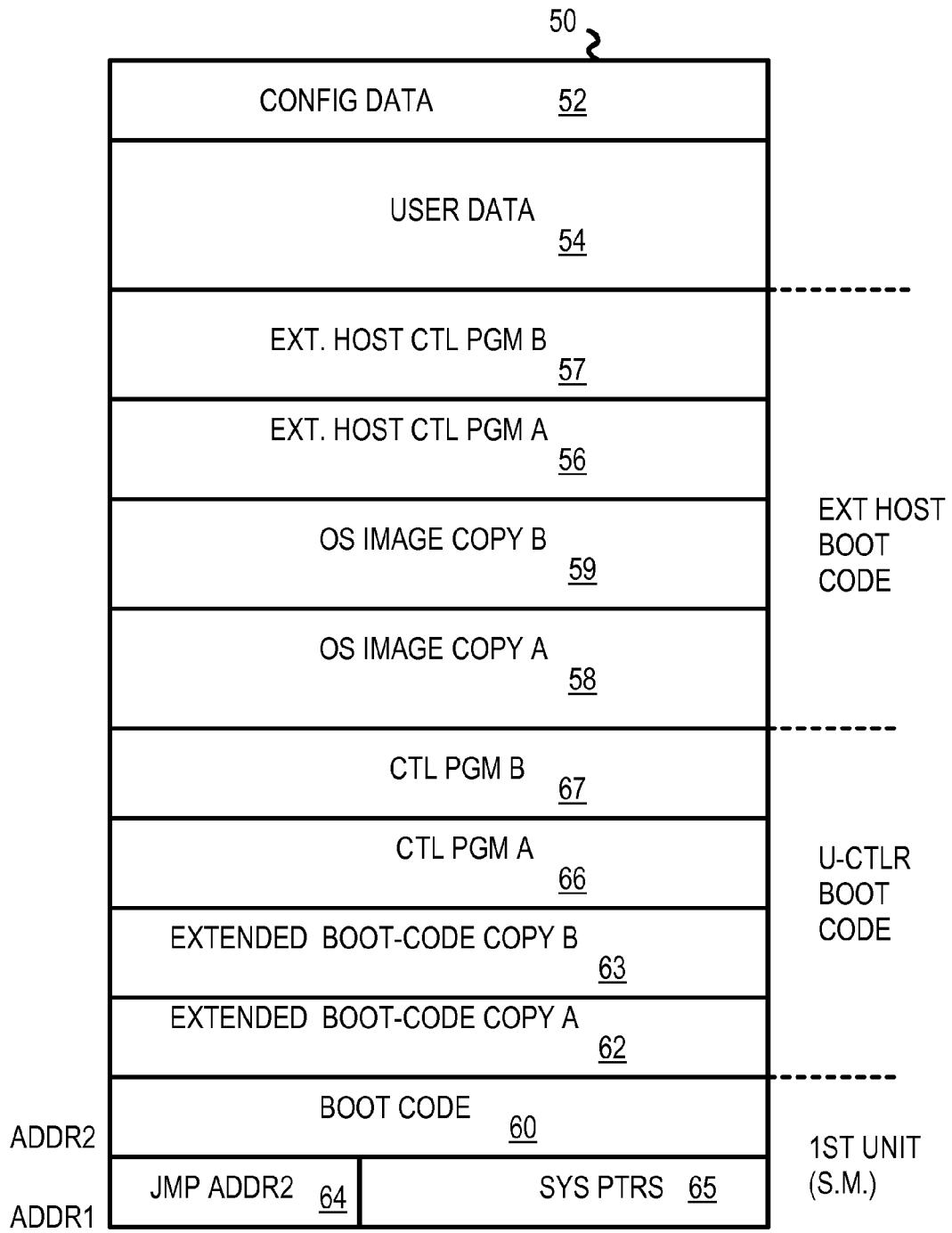
FIG. 4 shows boot code stored in a flash memory.

FIG. 4 shows boot code stored in a flash memory. Flash memory 50 is NAND-type flash memory that is block-accessible, allowing pages in a block to be written just once before the whole block is erased. Entire pages are read as one or more 512-byte sectors; individual bytes cannot be read or written.

Flash memory 50 stores initial boot loader 60 at the first page of the first block. Initial boot loader 60 begins with a jump address, JMP ADDR2 64, which points to the first instruction to execute in initial boot loader 60. Other system pointers 65 are also located near the beginning of initial boot loader 60. These other system pointers can be used as a table or pointers by boot-loader instructions.

Initial boot loader 60 is read from MLC flash memory 152 by boot-loader state machine 172 and written into SRAM buffer 154 (FIG. 2). Then the CPU in microcontroller 168 executes the initial boot loader by reading the jump address JMP ADDR2 64 and jumping to that address within initial boot loader 60 to begin executing instructions.

These instructions in initial boot loader 60 load further boot code into SRAM buffers 154, such as extended boot code 62, 63, which are 2 copies of the same boot code that is then executed by the CPU in microcontroller 168. Extended boot code 62, 63 is stored after initial boot loader 60 in the other pages of the first block.

Control program 66, 67 are two copies of the control program that is run by the CPU in microcontroller 168 once booting of the flash device is completed. This control program sends boot code to the external host that is read from MLC flash memory 152 and buffered by SRAM buffer 154.

Further blocks of flash memory store two copies of OS image 58, 59, which is the OS image for the host, and two copies of external-host control program 56, 57, which is the control program run on the external host's CPU. The external host can be rebooted once one copy of the OS image and the external-host control program has been successfully transferred to the external host.

Flash memory 50 also stores user data 54 and configuration data 52. User data 54 is the main user or application data stored by flash memory 50. Unused user storage 52 is available for new data.

Figure 5:
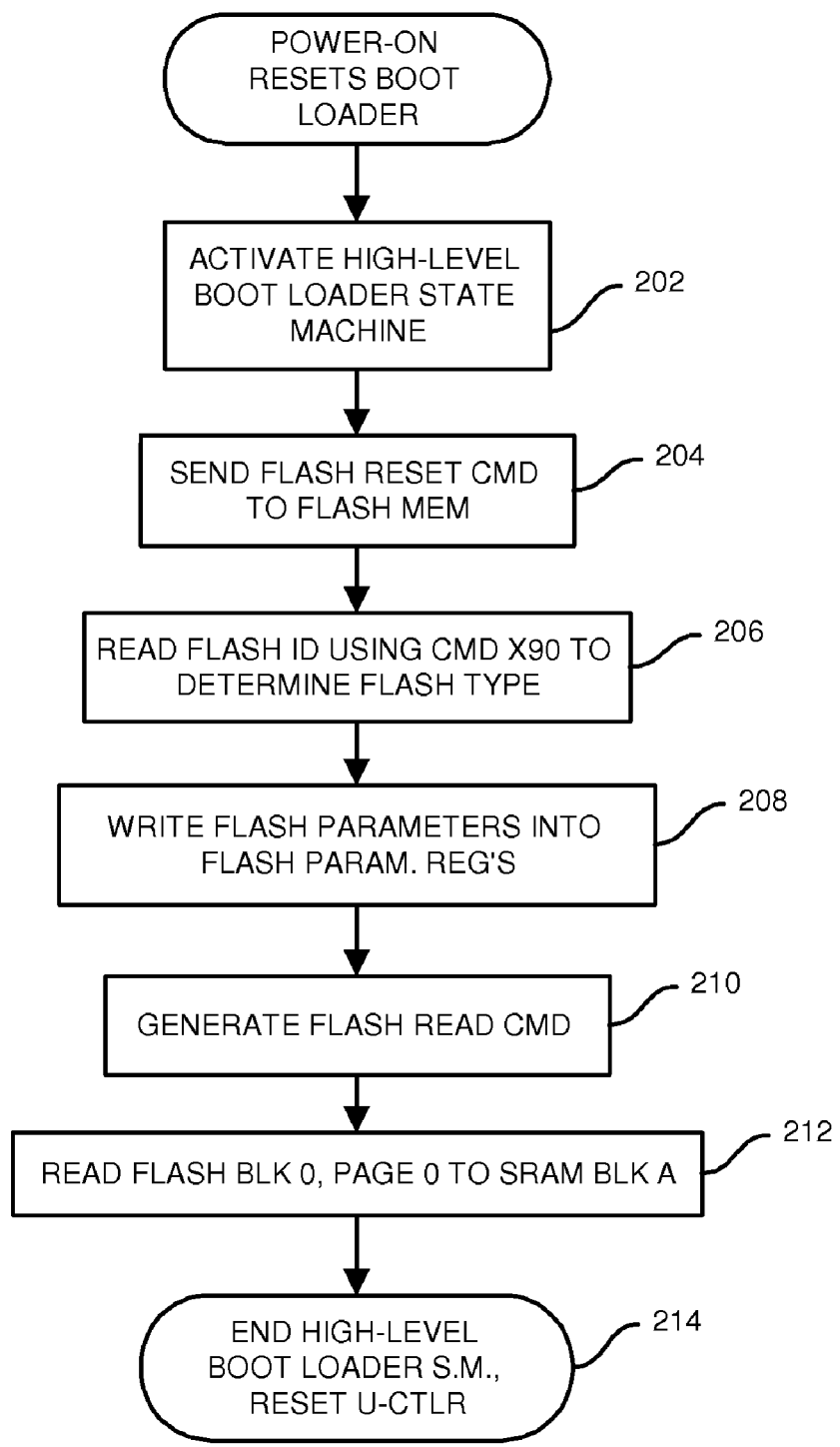
FIG. 5 is a flowchart of an initial power-on reset sequence for a dual-boot flash microcontroller.

FIG. 5 is a flowchart of an initial power-on reset sequence for a dual-boot flash microcontroller. Applying power to the flash device initiates this sequence first of all sequences. The high-level boot-loader state machine is activated by the power-on reset signal, step 202. A flash-reset command is then generated by the boot-loader state machine and sent to the MLC flash memory, step 204. The flash configuration or flash ID is then read from the just-reset MLC flash memory using an X90 command generated by the boot-loader state machine, step 206. The flash ID is parsed to locate configuration or flash parameters which are then written into the flash parameter registers (166 of FIG. 2), step 208.

The boot-loader state machine then activates the flash interface to generate a flash read command, step 210. The timing of the physical signals from flash interface 150 to MLC flash memory 152 is determined by the flash parameters written into the flash parameter registers in step 208.

Since the flash memory was reset in step 204, the first page of the first block in the MLC flash memory is read first, step 212. The flash data is written into SRAM buffer 154 as BLK A. Initial boot loader 60 (FIG. 4) is now loaded into BLK A of SRAM buffer 154. The boot-loader state machine can now end, step 214, after a reset signal is generated to microcontroller 168.

Figure 6:
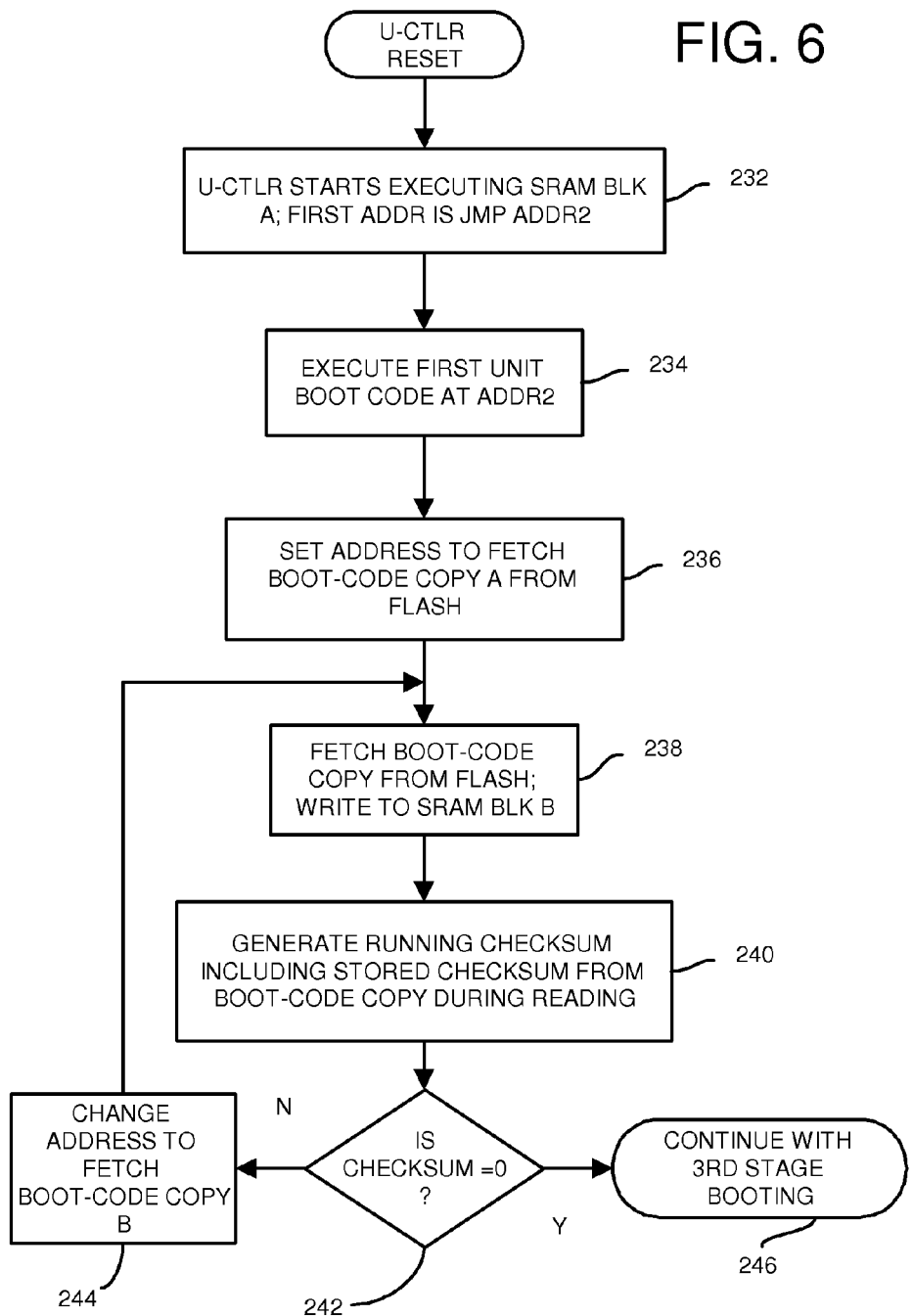
FIG. 6 is a flowchart of initial resetting of the microcontroller.

FIG. 6 is a flowchart of initial resetting of the microcontroller. Once the boot-loader state machine has loaded initial boot loader 60 into SRAM buffer 154 by following the steps in FIG. 5, the reset of microcontroller 168 activates the routine of FIG. 6.

After being reset, microcontroller 168 begins by reading the first address in BLK A of SRAM buffer 154, which is the JMP ADDR2 address, step 232. The microcontroller jumps to ADDR2, fetches that instruction and executes it, step 234, and the following instructions. This is the first unit boot code, or initial boot loader 60. These instructions set the address of flash interface 150 to read copy-A of boot code 62 from MLC flash memory 152, step 236. Copy-A of boot code 62 is read from flash memory and written to BLK B in SRAM buffer 154, step 238.

A running checksum is updated for each byte read from flash, step 240. The last bytes of the copy of boot code 62 includes a stored checksum, which is included when generating the running checksum. The stored checksum is calculated so that the final running checksum should be 0 when no errors occurred. Thus when the final running checksum is 0, step 242, then no errors were detected. The third stage of booting can proceed, step 246.

However, when the final running checksum was not zero, step 242, then an error was detected. The fetch address for flash interface 150 is changed to the initial address of Copy-B boot code 63 (FIG. 4), step 244, and fetching is repeated through steps 238, 240 for copy B. Should the final running checksum for copy-B be zero, then the third stage of booting can proceed, step 246. Otherwise, loading may be reattempted some number of times before device booting is abandoned.

Both one copy of control program 66, 67, and one copy of boot code 62, 63 can be loaded into BLK B by the process of FIG. 6

Figure 7:
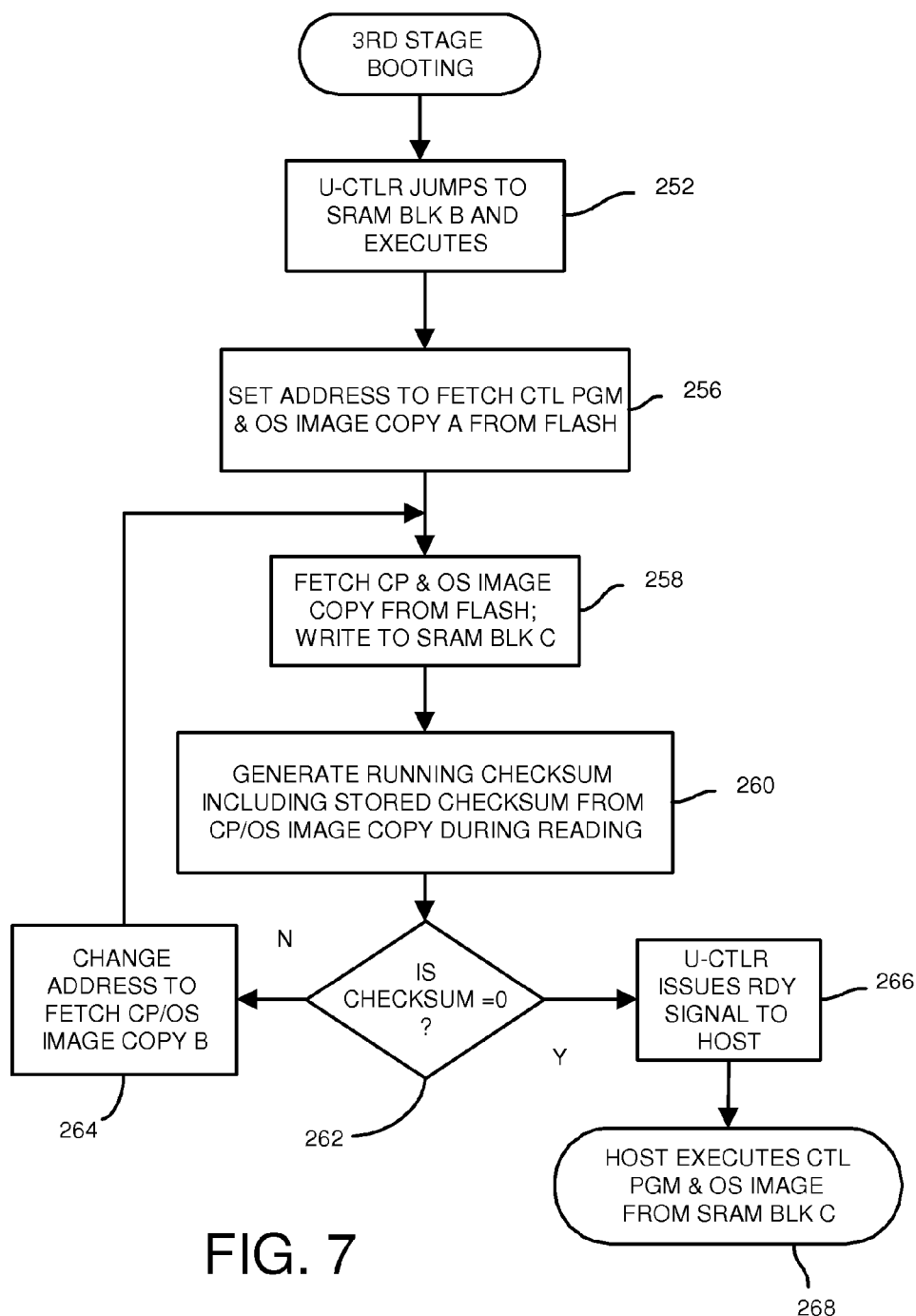
FIG. 7 is a flowchart of third stage booting of the microcontroller.

FIG. 7 is a flowchart of third stage booting of the microcontroller. Once initial boot loader 60 has loaded one copy of boot code 62, 63 and one copy of control program 66, 67 into BLK B, control program 66 begins executing on microcontroller 168. Control program 66 loads one copy of OS image 58, 59 and one copy of external-host control program 66, 67 into BLK C of SRAM buffer 154 by following the steps in FIG. 7.

When entering the third stage of booting, microcontroller 168 begins by jumping to an instruction in BLK B and executing that instruction in BLK B, step 252. A final instruction executed in initial boot loader 60 in BLK A points to this initial instruction in BLK B. These instructions in BLK B that are being executed in FIG. 7 are part of control program 66 (or control program 67).

The microcontroller continues to execute the following instructions in BLK B. These instructions set the address of flash interface 150 to read copy-A of OS image 58 and later to read copy-A of external-host control program 56 from MLC flash memory 152, step 256. Copy-A of OS image 58 and later copy-A of external-host control program 56 are read from flash memory and written to BLK C in SRAM buffer 154, step 258.

A running checksum is updated for each byte read from flash, step 260. The last bytes of the copy of external-host control program 56 include a stored checksum, which is included when generating the running checksum. The stored checksum is calculated so that the final running checksum should be 0 when no errors occurred. Thus when the final running checksum is 0, step 262, then no errors were detected.

However, when the final running checksum was not zero, step 262, then an error was detected. The fetch address for flash interface 150 is changed to the initial address of Copy-B OS image 59 (FIG. 4), step 264, and fetching is repeated through steps 258, 260 for copy B. Should the final running checksum for copy-B be zero, then the next stage of booting can proceed, step 266. Otherwise, loading may be reattempted some number of times before device booting is abandoned.

When a copy was successfully loaded with a zero final running checksum, step 262, then microcontroller 168 generates a ready signal to the external host, step 266. The external host then reads and executes external-host control program 56 using OS image 58 that is read by the external host from BLK C of SRAM buffer 154, step 268.

Figure 8:
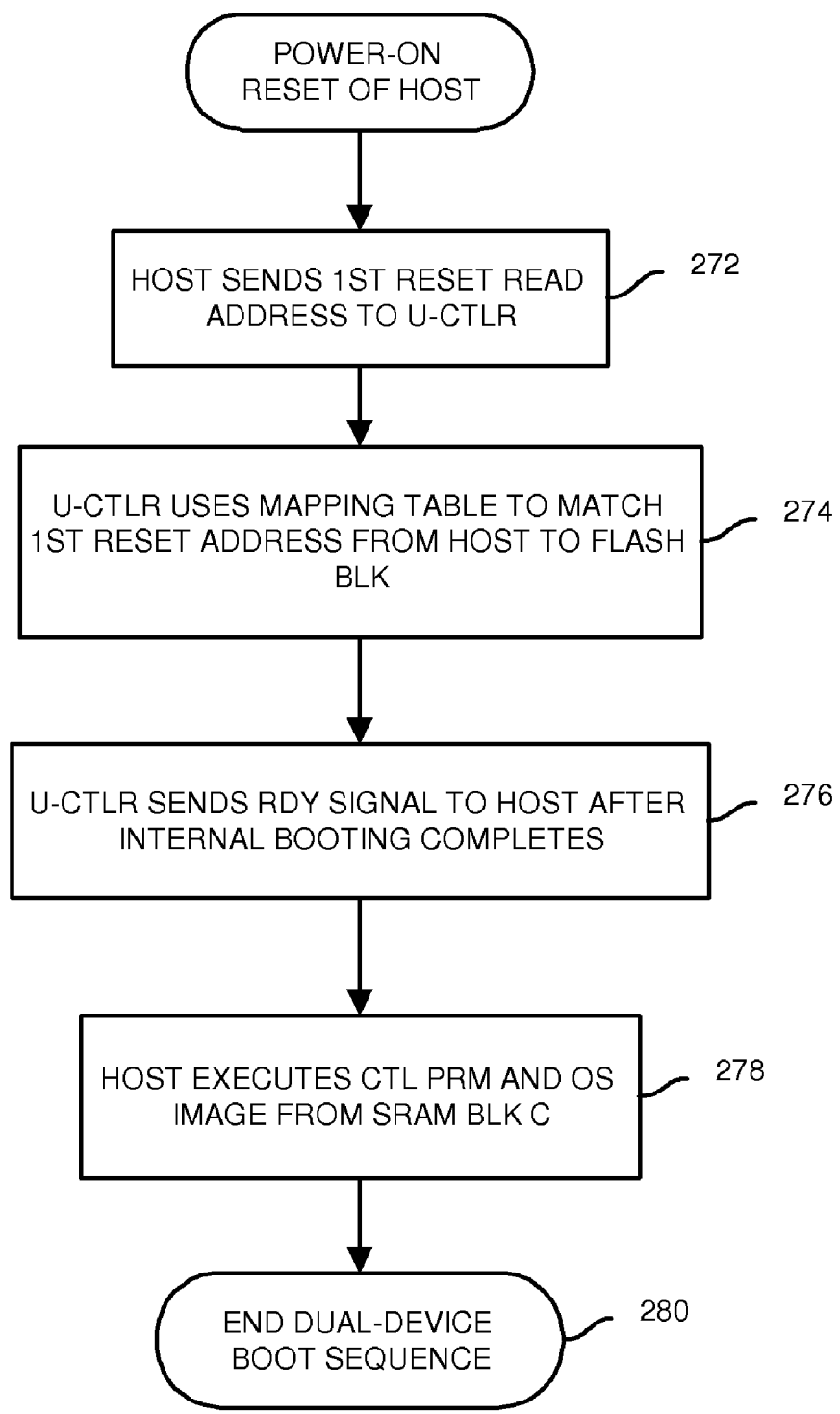
FIG. 8 is a flowchart of a power-up reset sequence for the external host.

FIG. 8 is a flowchart of a power-up reset sequence for the external host. The external host sends a first reset read request to the flash device, step 272, along with a first-reset read address. The flash device may still be in the process of booting itself using the procedures in FIGS. 5-7, and may not respond immediately to the external host.

The microcontroller accepts the first-reset read address from the external host during a late stage of booting, and loads this host address into mapping table 170 in an entry. The host address is the logical address, while the address of BLK C is the physical address for this entry. Microcontroller 168 automatically associates the first-reset read address from the external host with BLK C, which stores external-host control program 56 and OS image 58. Since the external host first executes an instruction from external-host control program 56 or from OS image 58 when booting from the flash device, this automatic association of the first-reset read address with the physical address for BLK C, step 274, is quite useful for dual-device booting.

Once the internal booting of microcontroller 168 completes (the procedures of FIGS. 5-7 are finished), the microcontroller sends a ready signal to the external host, step 276 (also step 266 in FIG. 7). The microcontroller sends instructions from BLK C to the external host, allowing the external host to execute external-host control program 56 using OS image 58 stored in BLK C, step 278. The dual-device boot sequence is completed, step 280, since both microcontroller 168 and external host 142 (FIG. 1) are re-booted.

Figure 9:
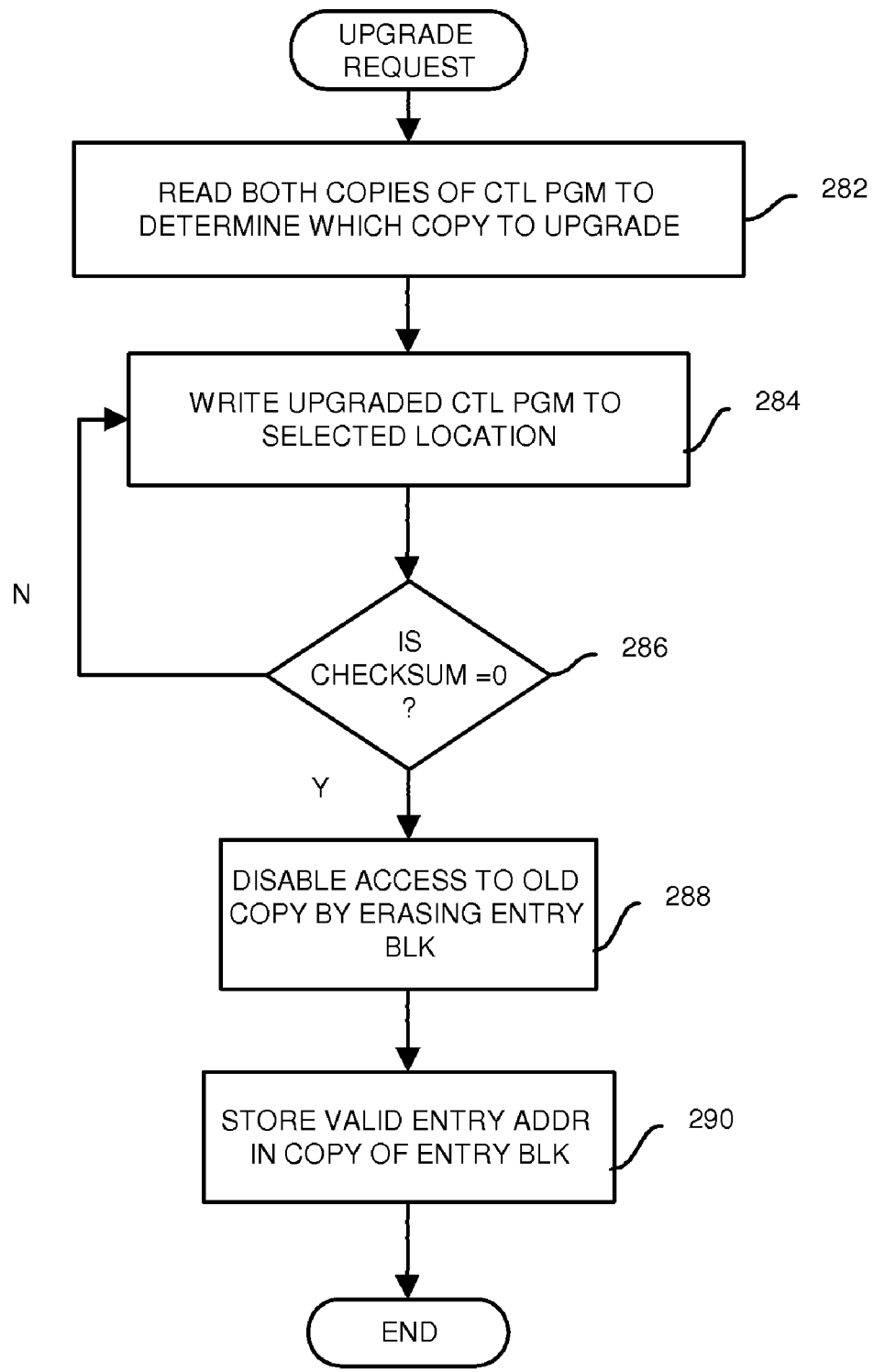
FIG. 9 is a flowchart of processing an upgrade request.

FIG. 9 is a flowchart of processing an upgrade request. Both copies of the control program are read to determine which copy to upgrade, step 282. A version may be read from each copy to determine which copy is the oldest, for example. The upgraded control program is written to the selected location, step 284. The newly-written control program is read and a running checksum is generated and compared to zero, step 286. When the running checksum is non-zero, the write may be repeated.

Once the running checksum is zero, writing was successful. Access to the old copy of the control program is disabled by erasing its entry block, step 288. A copy of the entry block is made, and the entry address for the updated control program is written into the copy of the entry block, step 290. The new entry block then replaces the old entry block, and the upgrade is complete.

Figure 10A:
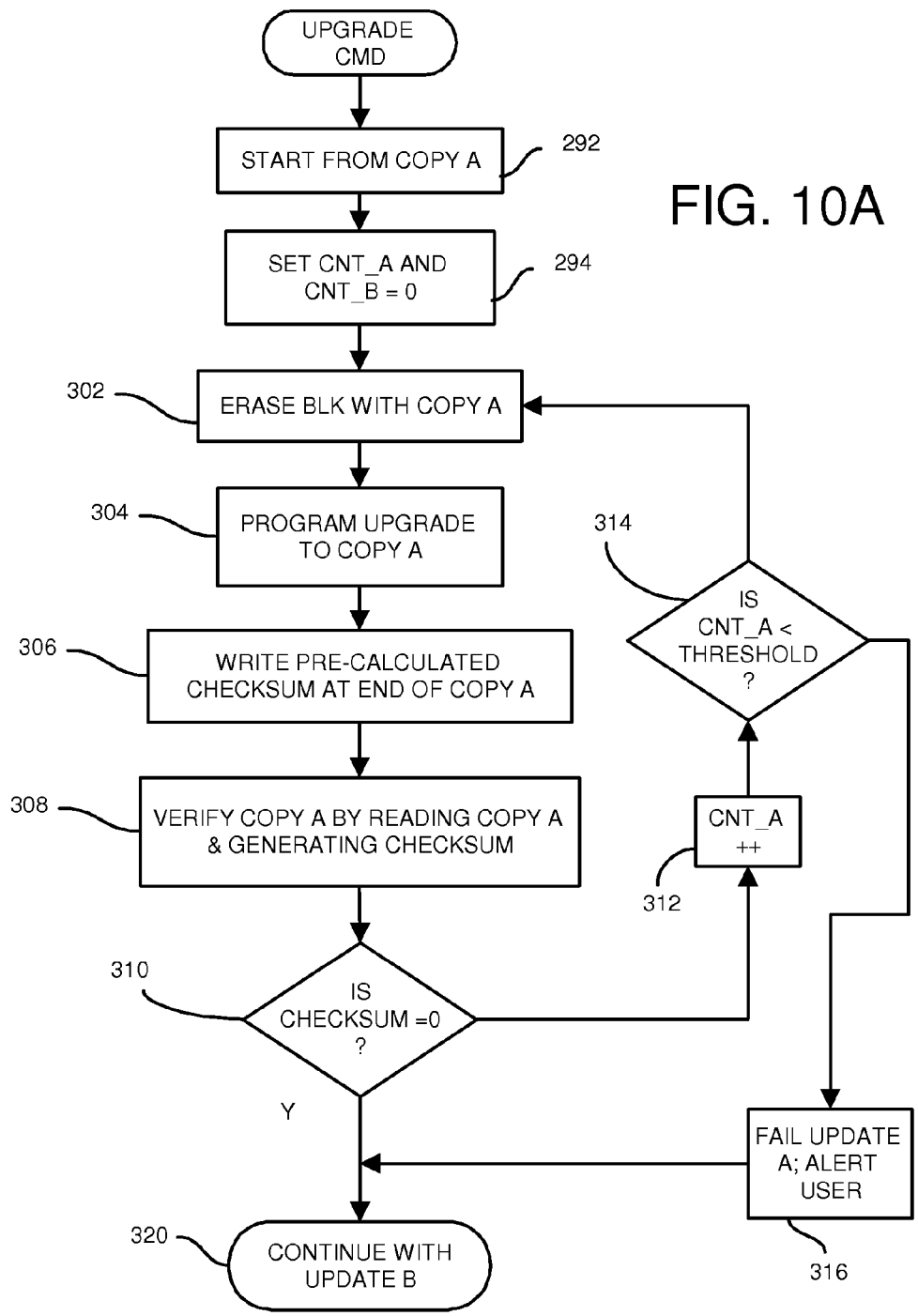
FIGS. 10A-B are flowcharts of upgrading both copies.
Figure 10B:
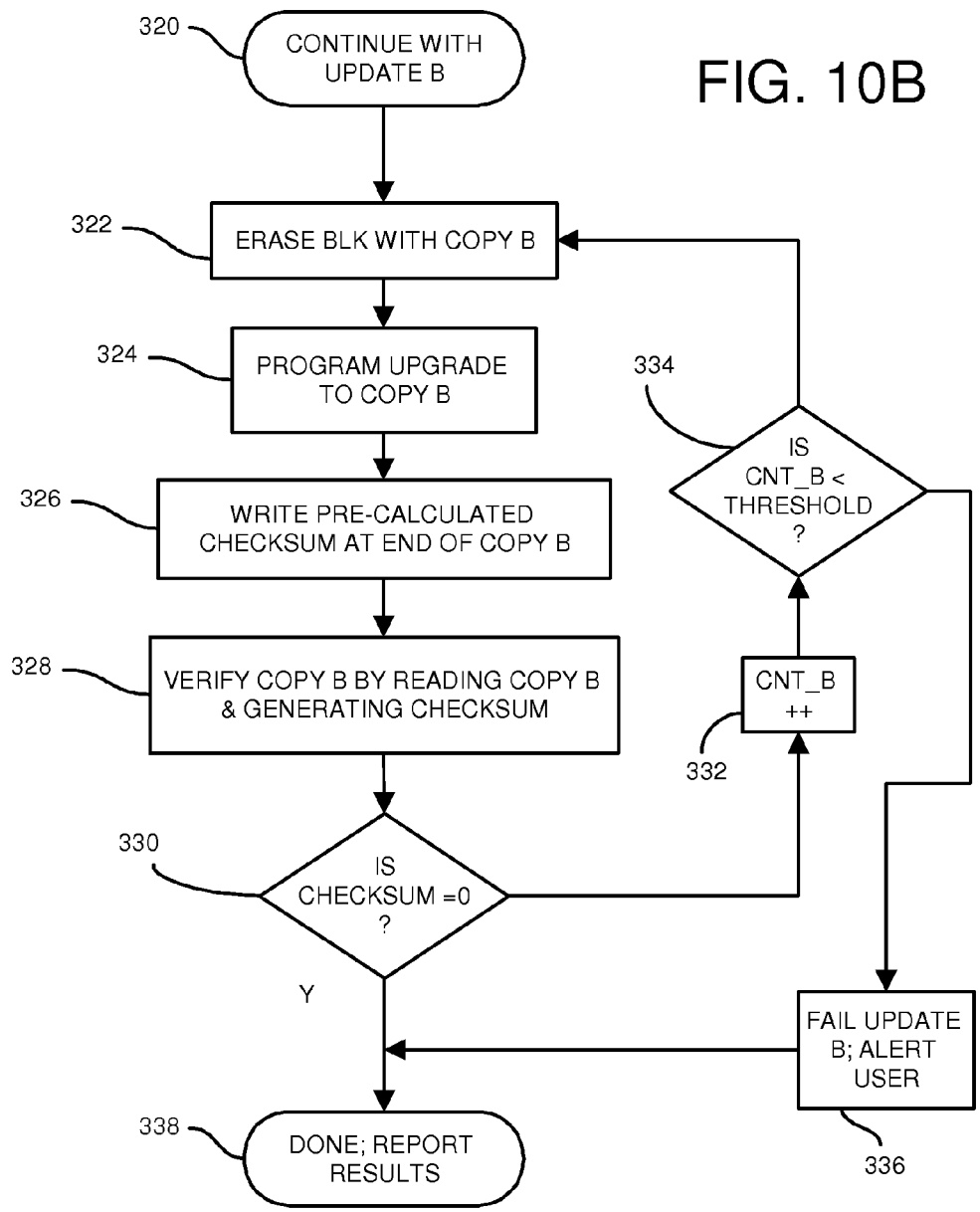

FIGS. 10A-B are flowcharts of upgrading both copies. Both copies of a control program, OS image, or boot code may be upgraded using this procedure. When an upgrade command is received, first copy A is processed, step 292. Counters for copies A and B, CNT_A and CNT_B, are cleared, step 294. The block with copy A is erased, step 302, and the upgrade is programmed into the erased block, step 304. A pre-calculated checksum is received with the upgraded program, and this pre-calculated checksum is written to the end of the block, step 306. The pre-calculated checksum causes the final running checksum to be zero when no errors occur.

The upgraded copy just written to flash is verified by reading the copy and generating a running checksum that includes the pre-calculated checksum stored in flash, step 308. When this final running checksum is zero, step 310, then no errors are detected. Upgrading can continue with copy B in FIG. 10B, step 320.

When the final running checksum is non-zero, step 310, then an error occurred. The A count is incremented, step 312, and compared to a threshold limit, step 314. When the A count exceeds the threshold, step 314, then upgrading fails and the user is notified, step 316. Otherwise, upgrading is re-attempted using steps 302 to 310 again.

In FIG. 10B, copy B is upgraded. The block with copy B is erased, step 322, and the upgrade is programmed into the erased block, step 324. A pre-calculated checksum received with the upgraded program is written to the end of the block, step 326. The pre-calculated checksum causes the final running checksum to be zero when no errors occur.

The upgraded copy just written to flash is verified by reading the copy and generating a running checksum that includes the pre-calculated checksum stored in flash, step 328. When this final running checksum is zero, step 330, then no errors are detected. Upgrading is finished, and the user may be notified, step 338.

When the final running checksum is non-zero, step 330, then an error occurred. The B count is incremented, step 332, and compared to a threshold limit, step 334. When the B count exceeds the threshold, step 334, then upgrading fails and the user is notified, step 336. Otherwise, upgrading is re-attempted using steps 322 to 330 again.

Figure 11:
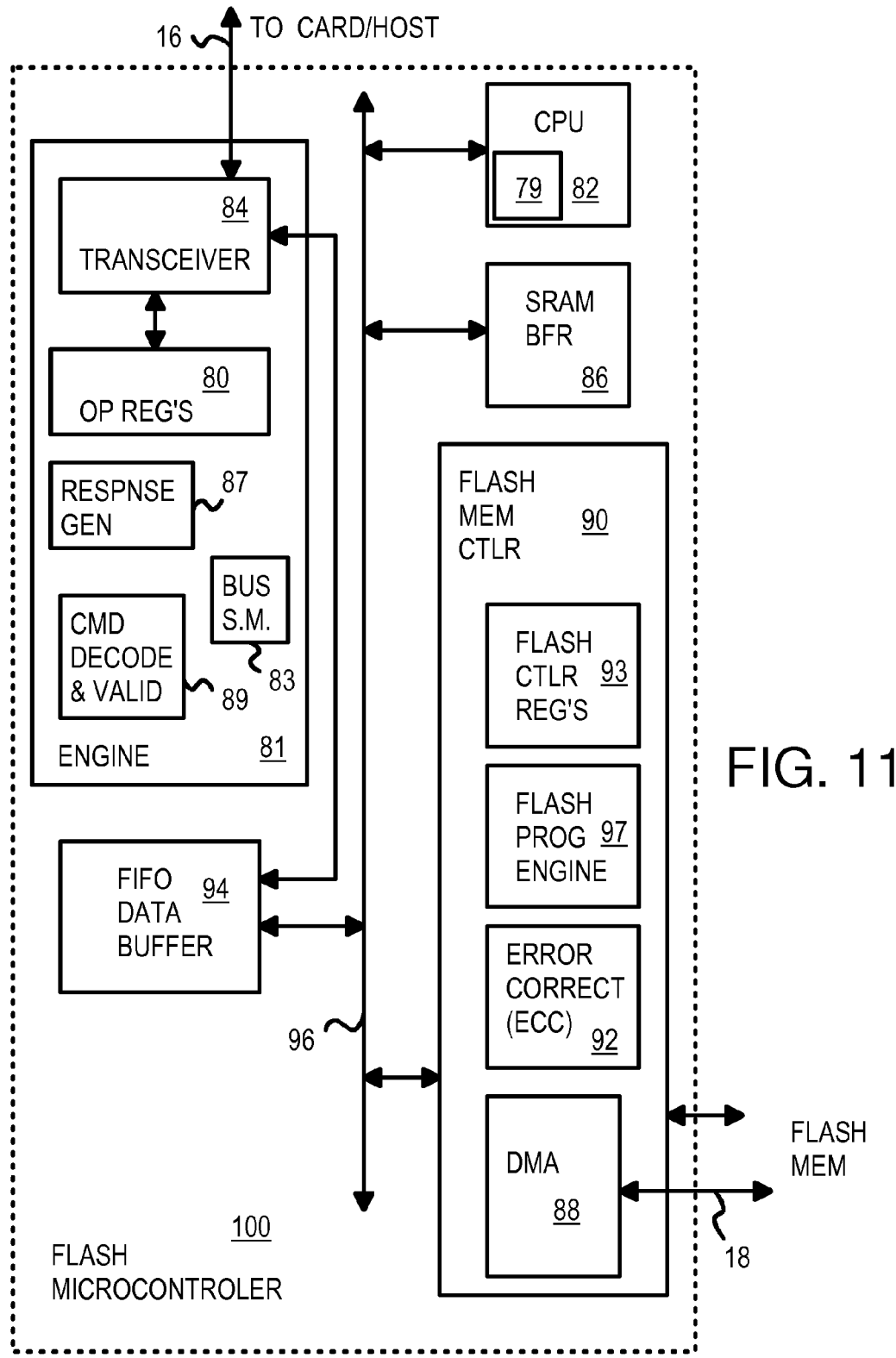
FIG. 11 is a block diagram of a Secure-Digital (SD) flash microcontroller.

FIG. 11 is a block diagram of a Secure-Digital (SD) flash microcontroller. SD flash microcontroller 100 can be booted from external flash memory.

Internal bus 96 connects CPU 82 with SRAM 86, FIFO data buffer 94, direct-memory access (DMA) engine 88, and flash-memory controller 90. CPU 82 executes instructions read from SRAM 86, using cache 79 to cache instructions and/or data.

DMA engine 88 can be programmed to transfer data between FIFO data buffer 94 and flash-memory controller 90. CPU 82 can operate on or modify the data by reading the data over bus 96. Cache 79 and external RAM can store instructions for execution by the CPU and data operated on by the CPU.

SD transceiver 84 connects to the clock CLK and parallel data lines D0:3 of SD bus 16 and contains both a clocked receiver and a transmitter. An interrupt to CPU 82 can be generated when a new command is detected on SD bus 16. CPU 82 can then execute a routine to handle the interrupt and process the new command.

SD operating registers 80 include the protocol registers required by the SD specification. Registers may include a data-port, write-protect, flash select, flash status, interrupt, and identifier registers. Other extension registers may also be present.

Command decode and validator 89 detects, decodes, and validates commands received over SD bus 16. Valid commands may alter bus-cycle sequencing by bus state machine 83, and may cause response generator 87 to generate a response, such as an acknowledgement or other reply. Different routines can be executed by CPU 82 or different transfer lengths can be performed by DMA engine 88 in response to the byte or sector capacity detected by command decode and validator 89.

The transmit and receive data from SD engine 81 is stored in FIFO data buffer 94, perhaps before or after passing through a data-port register in SD operating registers 80. Commands and addresses from the SD transactions can also be stored in FIFO data buffer 94, to be read by CPU 82 to determine what operation to perform.

Flash-memory controller 90 may also include a flash data buffer, which may contain the commands, addresses, and data sent over flash bus 18 to one or more flash mass-storage chips. Data can be arranged to match the bus width of flash bus 18, such as in 32 or 94-bit words. DMA engine 88 can be programmed by CPU 82 to transfer a block of data between flash bus 18 and FIFO data buffer 94.

Flash-specific registers in flash control registers 93 may include a data port register, interrupt, flash command and selection registers, flash-address and block-length registers, and cycle registers.

Error-corrector 92 can read parity or error-correction code (ECC) from flash mass storage chips and perform data corrections. The parity or ECC bits for data in that is being written to flash mass storage chips can be generated by error-corrector 92.

Flash programming engine 97 can be a state machine that is activated on power-up reset. Flash programming engine 97 programs DMA engine 88 with the address of the boot loader code in the first page of the external flash mass-storage chip, and the first address in cache 79 or in another local RAM, or in SRAM 86. Then flash programming engine 97 commands DMA engine 88 to transfer the boot loader from the flash mass storage chip to cache 79 or the other SRAM buffer, or to the external RAM. CPU 82 is then brought out of reset, executing the boot loader program starting from the first address in cache 79 or the SRAM buffer. The boot loader program can contain instructions to move a larger control program from the flash mass storage chip to SRAM 86. Thus SD flash microcontroller 100 is booted without an internal ROM on internal bus 96.

Alternate Embodiments

Several other embodiments are contemplated by the inventors. For example different numbers and arrangements of flash, SRAM, and SD cards or SD hosts can connect to the microcontroller. Rather than use SD buses, other buses may be used such as Memory Stick, PCI Express bus, Compact Flash (CF), IDE bus, Serial ATA (SATA) bus, etc. Additional pins can be added or substituted for the SD data pins. A multi-bus-protocol chip could have an additional personality pin to select which bus interface to use, or could have programmable registers. Rather than have a SD microcontroller, a Memory Stick microcontroller could be substituted, for use with a memory-stick interface, etc.

Universal-Serial Bus (USB) may be used rather than SD, or other serial buses may be used such as PCI Express, ExpressCard, Firewire (IEEE 1394), serial ATA, serial attached small-computer system interface (SCSI), etc. For example, when PCI Express is used, additional pins for the PCI Express interface can be added or substituted for the USB differential data pins. PCI express pins include a transmit differential pair PET+, PET−, and a receive differential pair PER+, PER− of data pins. A multi-bus-protocol chip could have an additional personality pin to select which serial-bus interface to use, or could have programmable registers. ExpressCard has both the USB and the PCI Express bus, so either or both buses could be present on an ExpressCard device.

Rather than write the initial boot sequence to address 0 in the SRAM, it can be written to another address in SRAM when the CPU can be configured to execute from an address other than 0.

While a sector size of 512 bytes has been described, the page size may have another size, such as 1K, 2K, 4K, 8K, etc. Flash blocks may have 4 pages, 8 pages, 64 pages, or some other number, depending on the physical flash chips and arrangement used.

While the invention has been described using an SD controller, a MMC controller may be substituted. A combined controller that can function for both MMC and SD may also be substituted. SD may be considered an extension of MMC, or a particular type of MMC, rather than a separate type of bus.

While the invention has been described as not requiring ROM for booting, some ROM may still be present on the chip. For example, a revision number may be included in a small ROM. Hard-wired gates that are tied to power or ground may also function as a read-only memory. While such ROM may be present, ROM is not required for storing boot code or booting instructions. A few bytes or more of ROM may be thus present for other purposes.

Mode logic could sense the state of a pin only at power-on rather than sense the state of a dedicated pin. A certain combination or sequence of states of pins could be used to initiate a mode change, or an internal register such as a configuration register could set the mode.

The microcontroller and SD components such as the bus interface, DMA, flash-memory controller, transaction manager, and other controllers and functions can be implemented in a variety of ways. Functions can be programmed and executed by the CPU or other processor, or can be implemented in dedicated hardware, firmware, or in some combination. Many partitioning of the functions can be substituted.

Data and commands may be routed in a variety of ways, such as through data-port registers, FIFO or other buffers, the CPU's registers and buffers, DMA registers and buffers, and flash registers and buffers. Some buffers may be bypassed or eliminated while others are used or present. Virtual or logical buffers rather than physical ones may also be used. Data may be formatted in a wide variety of ways.

The host can transfer standard SD commands and data transactions to the SD transceiver during a transaction. Other transaction types or variations of these types can be defined for special purposes. These transactions may include a flash-controller-request, a flash-controller-reply, a boot-loader-request, a boot-loader-reply, a control-program-request, a control-program-reply, a flash-memory-request, and a flash-memory-reply. The flash-memory request/reply may further include the following request/reply pairs: flash ID, read, write, erase, copy-back, reset, page-write, cache-write and read-status.

The host may be a personal computer (PC), a portable computing device, a digital camera, a phone, a personal digital assistant (PDA), or other electronic device. The partition of SRAM among various functions could change over time.

Wider or narrower data buses and flash-memory blocks could be substituted, such as 4, 5, 8, 16, 32, 64, 128, 256-bit, or some other width data channels. Alternate bus architectures with nested or segmented buses could be used internal or external to the microcontroller. Two or more internal and flash buses can be used in the SD flash microcontroller to increase throughput. More complex switch fabrics can be substituted for the internal buses.

The flash mass storage chips or blocks can be constructed from any flash technology including multi-level-logic (MLC) memory cells. Data striping could be used with the flash mass storage blocks in a variety of ways, as can parity and error-correction code (ECC). Data re-ordering can be adjusted depending on the data arrangement used to prevent re-ordering for overlapping memory locations. An SD/MMC switch could be integrated with other components or could be a stand-alone chip. The SD/MMC switch could also be integrated with the SD single-chip flash device. While a single-chip device has been described, separate packaged chips or die may be stacked together while sharing I/O pins, or modules may be used.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another a tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A dual-booting flash microcontroller comprising:
   a flash bus for connecting to a flash-memory chip, the flash bus carrying address, data, and commands to the flash-memory chip;
   microcontroller boot code stored in the flash-memory chip in a first block;
   host boot code stored in the flash-memory chip in a host-boot block;
   a static random-access memory (SRAM) buffer;
   a central processing unit (CPU) for executing instructions read from the SRAM buffer;
   a host interface for connecting to an external host over a host bus;
   a flash-memory interface for generating flash-control signals and for buffering commands, addresses, and data to the flash bus, and for reading and writing the SRAM buffer;
   a boot-loader state machine, activated by a reset signal, for activating the flash-memory interface to read the microcontroller boot code from the flash-memory chip, the boot-loader state machine writing the microcontroller boot code to the first block in the SRAM buffer;
   a mapping table storing mapping entries each having a logical address from the external host and a physical address of corresponding data stored in the flash-memory chip; and
   an initial mapping entry storing a first-reset-read address generated by the external host while the microcontroller boot code is being executed by the CPU;
   wherein the microcontroller boot code executed by the CPU activates the host interface to send the host boot code to the external host,
   whereby the initial mapping entry is generated from the first-reset-read address during booting of the dual-booting flash microcontroller.

2. The dual-booting flash microcontroller of claim 1 further comprising:
   flash parameter registers for storing flash parameters indicating access timing and structure of the flash-memory chip;
   wherein the boot-loader state machine reads a flash identifier from the flash-memory chip to generate the flash parameters.

3. The dual-booting flash microcontroller of claim 2 further comprising:
   a flash-reset generator, activated by the boot-loader state machine, the flash-reset generator generating a flash reset command applied to the flash-memory chip.

4. The dual-booting flash microcontroller of claim 2 wherein the host interface further comprises:
   a clocked-data interface to the host bus that connects to the external host;
   a bus transceiver for detecting and processing commands sent over the host bus;
   a buffer for storing data sent over the host bus.

5. The dual-booting flash microcontroller of claim 1 further comprising:
   a checksum generator that generates a final running checksum from bytes read from the SRAM buffer; and
   an error detector, coupled to the checksum generator, for signaling an error when the final running checksum has an error value.

6. The dual-booting flash microcontroller of claim 5 further comprising:
   a cache in the SRAM buffer, the cache having tags and data for caching data stored in the flash-memory chip.

7. A method for dual-booting a flash microcontroller and an external host comprising:
   applying power to the flash microcontroller that has a static random-access memory (SRAM) buffer and a central processing unit (CPU);
   activating a state machine on the flash microcontroller to read an initial boot loader from a first page in a first block of a flash memory coupled to the flash microcontroller by a flash bus;
   using the state machine to write the initial boot loader to the SRAM buffer in the flash microcontroller;
   resetting the CPU, causing the CPU to fetch instructions of the initial boot loader stored in the SRAM buffer;
   executing on the CPU the initial boot loader by fetching instructions in the initial boot loader from the SRAM buffer;
   reading a next page from the flash memory after the first page and writing the next page to a buffer area of the SRAM buffer as the initial boot loader is executed;
   continuing to read next pages from the flash memory and copy the next pages to the SRAM buffer as the initial boot loader is executed until all pages of an extended boot code have been copied to the SRAM;

transferring execution from the initial boot loader to the extended boot code in the SRAM buffer;

executing on the CPU the extended boot code and a control program in the extended boot code by fetching instructions in the extended boot code from the SRAM buffer;

reading a host-boot block from the flash memory after the extended boot code and writing the host-boot block to the SRAM buffer as the extended boot code is executed until an external-host control program has been copied to the host-boot block in the SRAM buffer;

transferring execution from the control program in the extended boot code to the external-host control program by executing a last instruction in the extended boot code that causes the flash microcontroller to send a ready signal to the external host; and sending the external-host control program read from the host-boot block in the SRAM buffer to the external host and executing the external-host control program on the external host to reboot the external host, whereby the flash microcontroller is booted by fetching and executing instructions from the SRAM buffer and the external host is booted by fetching and executing instructions from host-boot block in the SRAM buffer.

8. The method for dual-booting of claim 7 further comprising:

receiving a first-reset address from the external host while the CPU in the flash microcontroller is executing boot code; and creating a first entry in a mapping table, the first entry storing the first-reset address as a logical address, and storing an address of the host-boot block in the SRAM buffer as a physical address for the first entry, whereby the first entry for the host-boot block is automatically generated during booting.

9. The method for dual-booting of claim 7 further comprising:

generating a running checksum as boot code is read from the flash memory into the SRAM buffer;

generating a final running checksum as a stored checksum at an end of the boot code is read from the flash memory; and generating an error when the final running checksum is non-zero.

10. The method for dual-booting of claim 9 further comprising:

reading a backup copy of the boot code from the flash memory when the final running checksum is non-zero.

11. The method for dual-booting of claim 7 further comprising:

sending a flash-reset command to the flash memory when the state machine is executing;

reading a flash identifier from the flash memory after the flash-reset command is sent;

using the flash identifier to generate flash parameters; and writing the flash parameters to flash parameter registers in the flash microcontroller.

12. The method for dual-booting of claim 11 further comprising:

upgrading boot code stored in the flash memory by:

locating an older copy of the boot code stored in an upgrading block in the flash memory;

erasing the older copy in the flash memory; and writing an upgraded copy of the boot code to the upgrading block.

13. The method for dual-booting of claim 12 further comprising:

verifying the upgraded copy by reading the upgraded copy of the boot code from the upgrading block to generate a final running checksum; and repeating erase and writing of the upgrading block when the final running checksum is non-zero.

14. A dual-device booting flash microcontroller comprising:

external host interface means for connecting to an external host;

flash bus means for connecting to a flash memory, the flash bus means carrying address, data, and commands to the flash memory;

flash-memory controller means for generating flash-control signals and for buffering commands, addresses, and data to the flash bus means;

volatile buffer means for storing instructions in a volatile memory;

external-host boot sequence means, stored in the flash memory, for transfer to the external host over the external host interface means, wherein the external-host boot sequence means contains instructions for execution by the external host after the external host is re-booted;

processor means for fetching and executing instructions from the volatile buffer means;

extended-local boot sequence means, stored in the flash memory, for instructing the processor means to read the external-host boot sequence means from the flash memory and to write the external-host boot sequence means into the volatile buffer means;

initial boot loader means, stored in the flash memory, for instructing the processor means to read the extended-local boot sequence means from the flash memory and to write the extended-local boot sequence means into the volatile buffer means; and hardwired initializer means, activated by a reset signal, for activating the flash-memory controller means to read the initial boot loader means from the flash memory, and for writing the initial boot loader means as first instructions to the volatile buffer means.

15. The dual-device booting flash microcontroller of claim 14 further comprising:

flash parameter register means for storing flash parameters indicating timing and access specifications of the flash memory; and parameter write means, activated by the hardwired initializer means, for reading a flash identifier from the flash memory, for using the flash identifier to generate flash parameters, and for writing the flash parameters to the flash parameter register means;

wherein the flash-memory controller means reads the flash parameters from the flash parameter register means to generate flash-control signals that meet the timing and access specifications of the flash memory, whereby flash parameters are extracted during initialization.

16. The dual-device booting flash microcontroller of claim 14 further comprising:

checksum means for generating a running checksum when boot code is read from the flash memory, wherein the boot code comprises the external-host boot sequence means or the extended-local boot sequence means;

verify means for comparing the running checksum after the boot code has been read from the flash memory to a valid checksum value, and for signaling an error when the valid checksum value is not generated by the checksum means; and address means, activated by the error signaled by the verify means, for switching an address to point to an alternate copy of the boot code in the flash memory.

17. The dual-device booting flash microcontroller of claim 14 wherein the initial boot loader means further comprises:

an initial jump instruction that is executed before other instructions in the initial boot loader means, the initial jump instruction causing the processor means to fetch subsequent instructions in the initial boot loader means from a jump target address in the volatile buffer means.

18. The dual-device booting flash microcontroller of claim 14 further comprising:

reset means for resetting the processor means to begin fetching and executing instructions from the initial boot loader means stored in the volatile buffer means, the reset means activating the processor means in response to the hardwired initializer means.

19. The dual-device booting flash microcontroller of claim 14 further comprising:

mapping table means for storing mapping entries that associate a logical address from the external host with a physical address in the flash memory or in the volatile buffer means;

first read reset means for receiving a first read reset address from the external host and for storing the first read reset address as the logical address in a first entry in the mapping table means; and matching means for writing an address of the external-host boot sequence means stored in the volatile buffer means as the physical address for the first entry in the mapping table means, whereby the first entry is generated automatically from the first read reset address.

20. The dual-device booting flash microcontroller of claim 19 further comprising:

external ready means, activated when the external-host boot sequence means has been loaded into the volatile buffer means, for activating the external host to re-boot and fetch and execute instructions from the external-host boot sequence means stored in the volatile buffer means, whereby the external host is also re-booted.

* * * * *